US012698666B1

(12) United States Patent
Dodds

(10) Patent No.: US 12,698,666 B1
(45) Date of Patent: Aug. 4, 2026

(54) BI-FOLD DOOR STOP

(71) Applicant: Robert J. Dodds, Rosemount, MN (US)

(72) Inventor: Robert J. Dodds, Rosemount, MN (US)

(*) Notice: Subject to any disclaimer, the term of this patent is extended or adjusted under 35 U.S.C. 154(b) by 6 days.

(21) Appl. No.: 16/835,658

(22) Filed: Mar. 31, 2020

Related U.S. Application Data

(63) Continuation of application No. 15/592,169, filed on May 10, 2017, now Pat. No. 10,604,982.

(60) Provisional application No. 62/349,946, filed on Jun. 14, 2016, provisional application No. 62/336,912, filed on May 16, 2016, provisional application No. 62/334,217, filed on May 10, 2016.

(51) Int. Cl.
*E05F 5/06* (2006.01)
*E06B 3/48* (2006.01)

(52) U.S. Cl.
CPC ................ *E05F 5/06* (2013.01); *E06B 3/481* (2013.01); *E05Y 2900/20* (2013.01)

(58) Field of Classification Search
CPC .......... E05F 5/06; E05F 7/005; E05D 15/266; E05D 15/26; E05D 15/264; E06B 3/481; E05Y 2900/20; E05Y 2900/132
See application file for complete search history.

(56) References Cited

U.S. PATENT DOCUMENTS 3,191,214 A * 6/1965 Protzman .............. E05D 7/0027 16/87 R
4,642,846 A * 2/1987 Lautenschlager ..... E05D 7/0407 16/370
4,703,539 A * 11/1987 Lautenschlager, Jr. ...................... E05D 7/125 16/382
4,718,143 A * 1/1988 Lautenschlager, Jr. ...................... E05D 7/0407 16/382
4,799,290 A * 1/1989 Lautenschlager, Jr. ...................... E05D 7/125 16/241
4,884,371 A * 12/1989 Gagnon ................ E06B 3/9647 49/501
5,632,064 A * 5/1997 Lautenschlager ....... E05D 7/123 16/382
5,664,288 A * 9/1997 Lautenschlager ......... E05D 5/08 16/272
6,163,930 A * 12/2000 King ......................... E05D 7/04 16/388

(Continued)

*Primary Examiner* — Daniel P Cahn
*Assistant Examiner* — Shiref M Mekhaeil
(74) *Attorney, Agent, or Firm* — Albert W. Watkins

(57) ABSTRACT

A bi-fold door stop controls movement and travel of lead and pivot doors in a set of vertically hung bi-fold doors. The bi-fold door stop has at least two non-parallel surfaces that each may act upon one or both of the lead and pivot door stiles to limit movement in two directions. Movement transverse to the track longitudinal axis is limited when the bi-fold door is either fully open or fully closed, while parallel movement is controlled by limiting the extent that the bi-fold door may be opened. At least two non-parallel surfaces are provided that each may act upon one or more of the lead and pivot door stiles, while an additional surface may act upon the face of the pivot door. The bi-fold door stop may be fabricated as a single part using common molding operations, and acts directly on the door panels, thereby preserving bi-fold door hardware.

16 Claims, 8 Drawing Sheets

(56) References Cited

U.S. PATENT DOCUMENTS

| | | | | |
|---|---|---|---|---|
| 6,314,616 | B1 * | 11/2001 | King | E05D 5/08 16/382 |
| 6,408,486 | B1 * | 6/2002 | Saliba | E06B 3/485 16/382 |
| 6,430,778 | B1 * | 8/2002 | King | E05D 5/02 16/382 |
| 6,523,225 | B1 * | 2/2003 | Pecar | E05D 7/0407 16/382 |
| 6,675,440 | B1 * | 1/2004 | Lautenschlager | E05D 7/125 16/258 |
| 6,766,561 | B1 * | 7/2004 | Cheng | E05D 11/00 16/382 |
| 6,959,498 | B1 * | 11/2005 | Klonowski, III | B23B 47/287 33/194 |
| 7,490,385 | B2 * | 2/2009 | Migli | E05D 7/0407 16/382 |
| 7,594,300 | B2 * | 9/2009 | Nallamottu | E05D 7/0407 16/236 |
| 8,056,286 | B2 * | 11/2011 | Gosling | E05F 5/003 49/404 |
| 8,650,711 | B1 * | 2/2014 | Chen | E05F 5/006 16/54 |
| 10,794,108 | B1 * | 10/2020 | Dodds | E06B 3/481 |
| 10,961,770 | B1 * | 3/2021 | Fernandez | E06B 9/02 |
| 2013/0219659 | A1 * | 8/2013 | Oshima | E05D 7/125 16/236 |
| 2017/0218675 | A1 * | 8/2017 | Cooper | E05D 3/142 |
| 2017/0247921 | A1 * | 8/2017 | Pelekanos | E05D 15/26 |
| 2017/0292301 | A1 * | 10/2017 | Hirtsiefer | E05D 5/08 |

* cited by examiner

Fig. 3
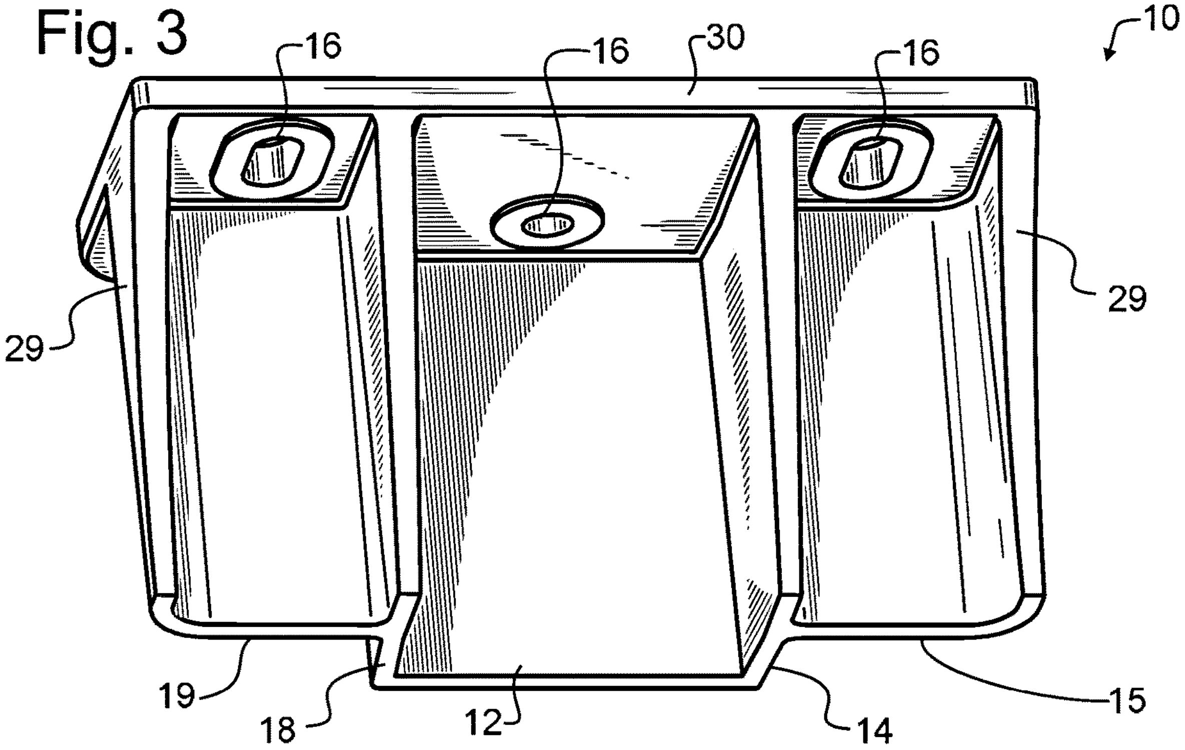
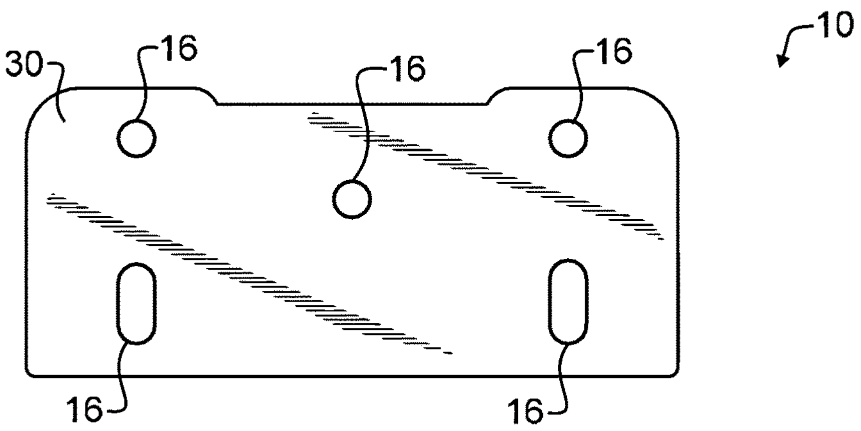
Fig. 4

BI-FOLD DOOR STOP

CROSS REFERENCE TO RELATED APPLICATIONS

The present application claims the benefit of the following U.S. provisional patent applications 62/334,217 filed May 10, 2016 and entitled “Bi-fold Door Stop”; 62/336,912 filed May 16, 2016 and entitled “Bi-fold Door Bottom Pivot Bracket Shim System”; and 62/349,946 filed Jun. 14, 2016 and entitled “Bi-fold Door Stop”; each of like inventorship, the teachings and entire contents of each which are incorporated herein by reference.

BACKGROUND OF THE INVENTION

1. Field of the Invention

This invention relates generally to vertically hung, track guided, pivotally folded doors of the type commonly used for closets, commonly known as bi-fold or bifold doors, and more particularly to improved closure checks and related hardware operative in combination therewith.

2. Description of the Related Art

When a person requires storage, whether it be for clothing, linens, supplies, or for any other storage purpose, it is desirable to have good visual access to the items being stored. This allows a person to readily store and retrieve more items, with much less effort. In order to do so, this storage space can, for exemplary purposes, be in the form of a walk-in closet. However, such closets require a substantial amount of square footage, since the storage space must not only be large enough for the things being stored, but also for the person storing and retrieving the merchandise to be physically completely inside the storage space. Consequently, for many closets, pantries, and the like, few people choose a walk-in space.

In contrast, for exemplary and non-limiting purposes, a long and relatively shallower closet than runs along a pre-existing walk space does not require any extra space for the person, substantially reducing wasted space. However, since this is a walkway or space used for other purposes, it is very desirable that the door into the storage space not block the walkway or area adjacent to the storage space entry. Unfortunately, single panel doors such as are commonly used as entry doors into bedrooms and the like must be of width equal to the width of the opening. So, for a storage space to have 32" of directly accessible width, a door that is at least close to the 32" width is required. This means that the door will swing into the walkway, creating a hazard. Furthermore, for wider storage spaces, which as noted above is desirable, the size of the door becomes unwieldy or even impractical or impossible. Instead, some closet spaces are closed by two doors, each having an outside hinge, that swing together to close the storage area. This allows essentially twice the directly accessible storage space without having to enter the storage area, but still involves large doors that either pivot entirely out into the walkway or entirely into the closet, in either case interfering with and potentially blocking the closet or the walkway.

Recognizing the limitations of these single panel doors, many artisans have devised or improved upon a multi-panel arrangement referred to as a bi-fold door. A typical vertically hung bi-fold door is comprised of two half-doors that are connected together by hinges; the pivot door and lead door.

The pivot door is mounted to the finished opening by a spring loaded top pivot pin inserted into a pivot bracket mounted within a track, and an adjustable height bottom pivot pin is inserted into a bottom pivot bracket at the base of the door jamb. The pivots support the entire weight of both doors. The lead door is connected to the pivot door by hinges. On the upper corner of the lead door is a guide pin assembly. This assembly is comprised of a wheel, roller, slider, or the like mounted to a spring-loaded axle that is installed into a hole on the edge of the door. The guide pin slider runs in the bi-fold track that is mounted to the header of the doorway. The track guides the lead door pin throughout the travel distance and keeps the doors in a tight path, out of the walkway or other space. Consequently, the opening is divided into smaller panels that fold up in pairs and stack neatly against the edges of the opening when the door is opened, and which slide out and close the storage entry when closed. The bi-fold door is a particularly pervasive design, owing to the economical construction and installation of the doors, tremendous accessibility to storage space, and minimal space required by the doors when fully open and when being opened.

Exemplary U.S. patents showing various bi-fold doors and related hardware, the teachings which are incorporated herein by reference, include: U.S. Pat. No. 1,361,913 by Sebastian, entitled “Casement window”; U.S. Pat. No. 1,934,299 by Fairhurst, entitled “Folding partition”; U.S. Pat. No. 2,842,795 by Majeske, entitled “Adjustable pivot for door track”; U.S. Pat. No. 3,066,730 by Schwartzberg, entitled “Combination folding door and guide means therefor”; U.S. Pat. No. 3,221,804 by Rudnick, entitled “Folding door structure and assembly”; U.S. Pat. No. 3,400,749 by Smith, entitled “Bifold door handle”; U.S. Pat. No. 4,644,992 by Jerila, entitled “Pivot block for bifold doors”; U.S. Pat. No. 5,080,160 by Gephart et al, entitled “Track and pivot bracket for bi-fold doors”; U.S. Pat. No. 5,085,262 by Tutikawa, entitled “Device for supporting folding doors”; and U.S. Pat. No. 5,186,230 by Ostrander, entitled “Mechanism for operating bi-fold doors”.

Unfortunately, there are deficiencies in the design, manufacture, or installation of bi-fold doors which can lead to excessive wear and damage to the doors, track and components. When a person fully opens a bi-fold door, the lead door and pivot door are nearly parallel to each other and at a near perpendicular angle to the rail. In order to close the door, a person grasps onto the door knob that is mounted onto the lead door and pulls the door all the way until the bi-fold door closes flat, generally parallel to the rail. When a person attempts to close the bi-fold doors, both of the lead and pivot doors can slightly rotate around the pivot pin, towards the pulling force. When this occurs, the guide pin will stick or bind in the bi-fold track due to force being applied to the pivot pin being at a great angle to the path of the track.

When the doors are starting to close, there is a moment in which the lead door guide pin roller can bind or jam in track. This can occur when a person pulls on the door with either too much force or from a poor angle so that the door hinges are shifted towards the direction of travel and are ahead of the guide wheel. This causes an acute angle to form between the lead door and bi-fold door track on the closing side. In order for the doors to close, the hinge must be shifted back toward the door pivot so that the hinges follow behind the guide wheel. Once a sufficient angle is achieved between lead door and closet rail, the guide wheel will move freely and the pivot door will follow the lead door until the door is finally closed.

When the lead guide pin roller is jammed in the track, the person must stop pulling the door in order to reposition the doors, or redirect the angle of the pulling action. Repeated binding of the guide pin roller in the track can cause the track to deform, exasperating the problem. When the roller binds in the track, the leverage exerted on the guide pin axle will damage the guide pin and the mounting hole in the door.

The guide pin and pivot pin are spring loaded in order to facilitate installation of the door. As such, the wheel guide and pivots have considerable play in their movement.

In order to terminate the opening travel of the lead door guide pin, a stopper is commonly incorporated into the top pivot bracket. A number of these are illustrated in the patents already incorporated herein above by reference.

Unfortunately, a common problem with stops is that when the guide wheel assembly impacts the stopper, considerable force is applied to the guide pin axle and the mounting hole in the lead door. Over time, the resultant wear and damage to the guide pin components, and deformation of the pin mounting hole in the door, compounds the problem of the lead door guide pin roller binding in the track when the door is closed. Repeated impacts drive the pivot bracket along the track until it meets the jamb wall. With the pivot bracket in this position, there is no clearance for the pivot door to rotate when the doors are closed. This results in damage to the jamb wall, the door panel, the pivot pin and the track.

A number of artisans have devised various means to cushion the impact, and reduce the likelihood of damage. Exemplary U.S. patents, the teachings which are incorporated herein by reference, include: U.S. Pat. No. 2,882,962 by Hollansworth, entitled "Folding doors"; U.S. Pat. No. 2,987,756 by Hollansworth, entitled "Adjustable retainer for folding door pivot pin"; U.S. Pat. No. 3,096,539 by Dickinson et al, entitled "Folding door hinge assembly"; U.S. Pat. No. 3,144,077 by Dickinson et al, entitled "Folding door controlling hardware"; U.S. Pat. No. 3,246,684 by Rudnick, entitled "Hinge structure"; U.S. Pat. No. 3,536,120 by Kellems, entitled "Folding door installation and sliding guide therefor"; U.S. Pat. No. 3,554,267 by Brinker, entitled "Folding doors"; U.S. Pat. No. 3,907,021 by Smith, entitled "Alignment and retention hardware for folding doors"; U.S. Pat. No. 3,987,837 by Hewson, entitled "Bi-fold door assembly"; U.S. Pat. No. 5,085,261 by Bortoluzzi, entitled "Longitudinally sliding accordion door"; U.S. Pat. No. 6,438,795 by Haab et al, entitled "Buffer device"; and U.S. Pat. No. 7,258,153 by Chen, entitled "Auto-reversible folding door".

While these cushioned stoppers are generally beneficial to the life of bi-fold door hardware, these still fail to address the application of substantial forces perpendicular to or angularly offset from the track. However, at least one artisan has attempted to address both problems. U.S. Pat. No. 3,102,582 by Rudnick, entitled "Folding door structure", the teachings which are incorporated herein by reference, discloses a stop that provides both a cushioning effect and attempts to control the door hardware when forces are applied that are not parallel to the track longitudinal axis. Unfortunately, as also noted herein above, the guide pin and pivot pin are not very strong. They are spring loaded in order to facilitate installation of the door, and have considerable play in their movement. Consequently, Rudnick's approach the relies upon the guide and pivot pins in order to control off-axis movement still leads to premature failure.

As may be apparent, in spite of the enormous advancements and substantial research and development that has been conducted, there still remains a need for a bi-fold door stop that addresses the aforementioned deficiencies that are known to exist in the prior art.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a bi-fold door stop. The stop has a supporting plate generally defining a first generally planar surface. A second generally planar surface extends from the supporting plate in a plane generally perpendicular to the first generally planar surface, and is configured to engage with a bi-fold door stile. A third generally planar surface extends from the supporting plate in a plane generally perpendicular to the first generally planar surface and also generally perpendicular to the second generally planar surface. The third generally planar surface is configured to engage with the bi-fold door stile.

In a second manifestation, the invention is, in combination, a bi-fold door and a bi-fold door stop operative to safely limit the movement of the bi-fold door. The bi-fold door has a bi-fold door track; a lead door; a guide pin affixed to the lead door and configured to slide within the bi-fold door track; a pivot door; a pivot pin anchored with respect to the bi-fold door track and affixed to the pivot door; and a hinge coupling the lead door to the pivot door. At least of the lead door and pivot door have a door stile. The bi-fold door stop has a first bi-fold door stile stop configured to engage with and thereby limit travel of the door stile in a first travel direction; and a second bi-fold door stile stop configured to engage with and thereby limit travel of the door stile in a second travel direction generally perpendicular to the first travel direction.

In a third manifestation, the invention is a method of protecting a bi-fold door mounted within a static structure from at least some damage-inducing movements. The bi-fold door has at least a lead door panel and a pivot door panel, and moves along a path defined by a longitudinally extensive bi-fold door track. The method includes the step of applying a first force between at least one of the bi-fold door panels and the static structure responsive to and countering a perpendicular force applied to at least one of the bi-fold door panels in a first direction perpendicular to a longitudinal axis of the bi-fold door track. The method also includes the step of inducing a second force between at least one of the bi-fold door panels and the static structure responsive to and countering a parallel force applied to at least one of the bi-fold door panels in a second direction parallel to the bi-fold door track through the bi-fold door panels into the static structure when the lead door panel is at a position of movement most proximal to the pivot door panel and the parallel force is tending to bring the lead door panel and the pivot door panel closer together.

When a bi-fold door is in the fully open position, the guide stile of the lead door and the pivot stile of the pivot door protrude beyond the position the doors take in the closed position. This is a consequence of the mounting location of the guide pin and pivot pins on the doors; the guide pin and pivot pin axis being inboard, and not at an edge corner as would be the case with standard door hinges. The protrusion of the door pivot stiles as the door nears its fully open position facilitates the use of a mechanism or device to terminate the opening travel of the lead door by acting directly on the pivot door stile. Terminating the opening travel of the lead door by this means eliminates the need for the guide pin to be subject to impacting the top pivot bracket or other stop device located in the bi-fold track in order the terminate the opening travel of the doors. A second projection acting approximately parallel to the track prevents movement of the door perpendicular to the track when an attempt to close the door has caused the hinges to move ahead of the guide pin, resulting in a lateral movement of the guide pin in the track.

Various embodiments of the mechanisms of the present invention, or devices comprising the bi-fold door stop, or combination thereof may be located and installed on the doorway header adjacent to the track, on the pivot jamb wall, or on the floor, or doorway threshold. The mechanism or device may be mounted on the track independently of the standard bi-fold track hardware, or in some embodiments may be incorporated into the standard bi-fold track hardware as a component part of the top pivot bracket or other hardware part.

Further embodiments of the present invention include a mechanism as part of the stopper to hold the door in the fully open or fully closed position using magnets, spring clasp, or other means. An additional floor mounted stopper can be used to act on the base of the lead door. The floor mounted stopper, in conjunction with a header or track mounted stopper may prevent torquing or twisting of the door assembly when the set limit of opening travel is reached, as might happen if only the top of the door were constrained. A stopper mounted on the pivot jamb wall, at a height near mid door, may in an alternative embodiment prevent the twisting effect of a stopper acting only on the top of the door.

Objects of the Invention

The present invention and the preferred and alternative embodiments have been developed with a number of objectives in mind. While not all of these objectives may be found in every embodiment, these objectives nevertheless provide a sense of the general intent and the many possible benefits that are available from embodiments of the present invention.

A first object of the invention is to provide a bi-fold door stop that limits typical off-axis movement of both the lead and pivot doors to a safe amount. In a preferred embodiment of the invention, this is accomplished by providing a projection acting approximately parallel to the track. A second object of the invention is to provide a bi-fold door stop that terminates the closing travel of the lead door by acting directly on the pivot door stile. Another object of the present invention is to provide a bi-fold door stop that applies force in a non-damaging manner directly to the door stiles, rather than through the pivot or guide pins. A further object of the invention is to provide a bi-fold door stop that may be anchored to a building structure independent of track and other bi-fold hardware to increase the overall strength and durability of a bi-fold door. Yet another object of the present invention is to provide a bi-fold door stop that may in at least some cases be anchored intermediate between top and bottom of a door, thereby reducing the torque on a door when the stop is engaging therewith. An additional object of the invention is to provide a bi-fold door stop that may be readily fabricated using known and ordinary low cost, mass-production manufacturing techniques. Another object of the present invention is to provide a bi-fold door stop that is easy and intuitive to install and use.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 3 illustrates the preferred embodiment bi-fold door stop of FIG. 1 from a bottom, primarily rear projected view.

FIG. 4 illustrates the preferred embodiment bi-fold door stop of FIG. 1 from a top plan view.

DESCRIPTION OF THE PREFERRED EMBODIMENT

Figure 1:
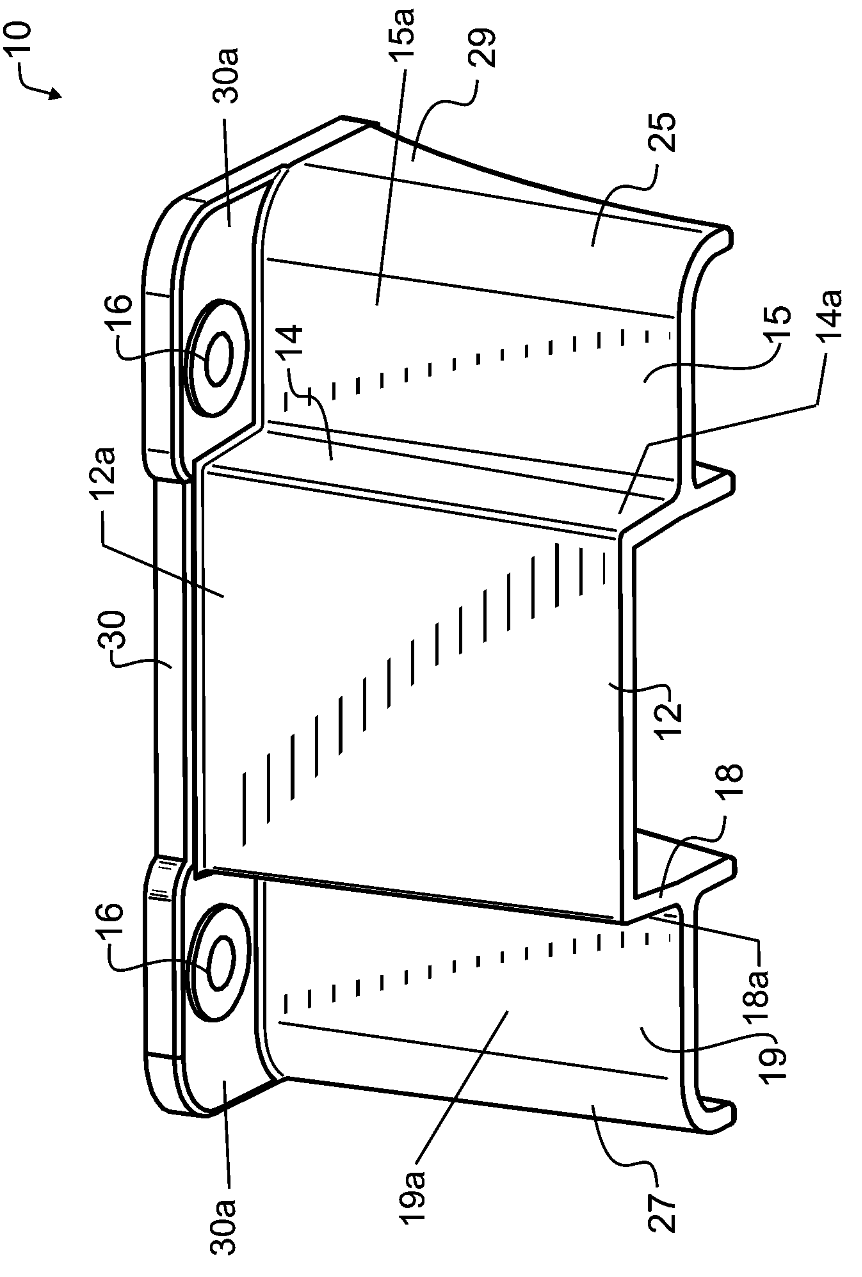
FIG. 1 illustrates a preferred embodiment bi-fold door stop designed in accord with the teachings of the present invention from a bottom, primarily front projected view.

FIGS. 1-4 illustrate a preferred embodiment bi-fold door stop 10 from front projected, bottom plan, rear projected, and top plan views, respectively. Preferred embodiment bi-fold door stop 10 is configured to be mounted in a doorway head jamb adjacent to exemplary prior art bi-fold door track 4. Preferred embodiment bi-fold door stop 10 includes a supporting plate 30 having a number of mounting holes 16 passing therethrough, some of which may be elongated to allow repositioning. Mounting holes 16 facilitate fastening to a static structure such as a beam, stud, wall or other components thereof for secure anchoring. While mounting holes 16 are preferred as being both intuitive and easily fabricated, in alternative embodiments other known methods of fastening to a static structure are considered incorporated herein.

A number of primary functioning structures project downward from planar surface 30*a* of supporting plate 30 and are supported by supporting plate 30. Among these are preferably a lead door opening stopper plate 14 and pivot door opening stopper plate 18, each having a plate geometry which approximately define a plane generally transverse to the longitudinal axis of bi-fold door track 4. The amount of separation between lead door opening stopper plate 14 and pivot door opening stopper plate 18 is determined in significant part by the dimensions of between-doors spacer 12.

In addition to lead door opening stopper plate 14 and pivot door opening stopper plate 18 that are operative in a plane generally transverse to the longitudinal axis of bi-fold door track 4, there are also two rotation stopper plates operative in a plane generally parallel to the longitudinal axis of bi-fold door track 4. These are lead door rotation stopper plate 15 and pivot door rotation stopper plate 19.

Figure 2:
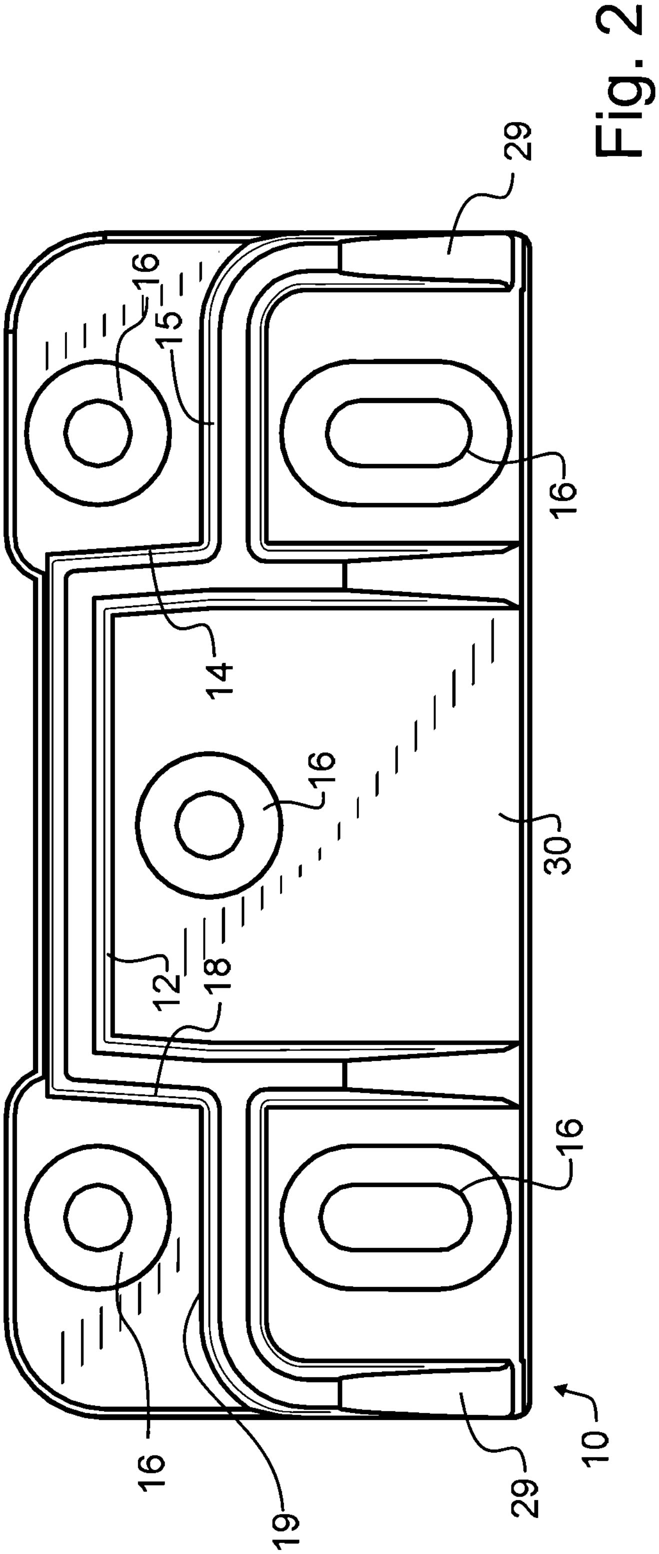
FIG. 2 illustrates the preferred embodiment bi-fold door stop of FIG. 1 from a bottom plan view.

While there are a myriad of possible geometries for the supporting structure that provides rigidity to these primary functioning structures, in preferred embodiment bi-fold door stop 10 this is achieved by providing a structure resembling three U-shaped or three-sided channel members, as best visible in FIGS. 2 and 3. Within each of these channels, a mounting screw hole 16 may conveniently be provided. The channel geometry helps to ensure that tools used to install preferred embodiment bi-fold door stop 10 do not accidentally contact and damage surrounding building structure such as walls, ceiling or doorway. In addition, the channels reduce the total materials required in the fabrication of preferred embodiment bi-fold door stop 10. Further, when plastic materials are used in the fabrication of preferred embodiment bi-fold door stop 10, such as by molding, casting, or the like, uneven shrinkage and cracking that may commonly occur with varying thicknesses of materials may be avoided. Nevertheless, in alternative embodiments, one or more of the between-doors spacer 12; lead door opening stopper plate 14; lead door rotation stopper plate 15; pivot door opening stopper plate 18; pivot door rotation stopper plate 19; and supporting plate 30 may have different or even non-planar geometries. For exemplary and non-limiting purposes, in the case of a casting or molding of suitable material, these may instead be much thicker and more solid structures, adding more weight and material but also adding strength to the resulting structure. In other alternative embodiments, the surface may not be entirely planar. For exemplary and non-limiting purposes the surfaces may have significant texture, porosity, uneven or inconsistent geometry or the like, the desirability which may depend greatly upon the materials used in the fabrication of preferred embodiment bi-fold door stop 10. Again for exemplary purposes, a diamond-patterned rubber surface may still provide adequate stopping forces, while resembling the planar surface defined by foam impact absorption pads 51, 52 described herein below. In alternative embodiments these surfaces may also be provided with desirable coatings, treatments, laminations, or other surface features. In preferred embodiment bi-fold door stop 10, these surfaces will most preferably match or mate with the corresponding surfaces of the door components with which they engage. In most instances, the door stiles with which these surfaces will engage are planar, and consequently a most preferred geometry is either planar, or at least not likely to damage the door stile surfaces under reasonable circumstances.

Figure 5:
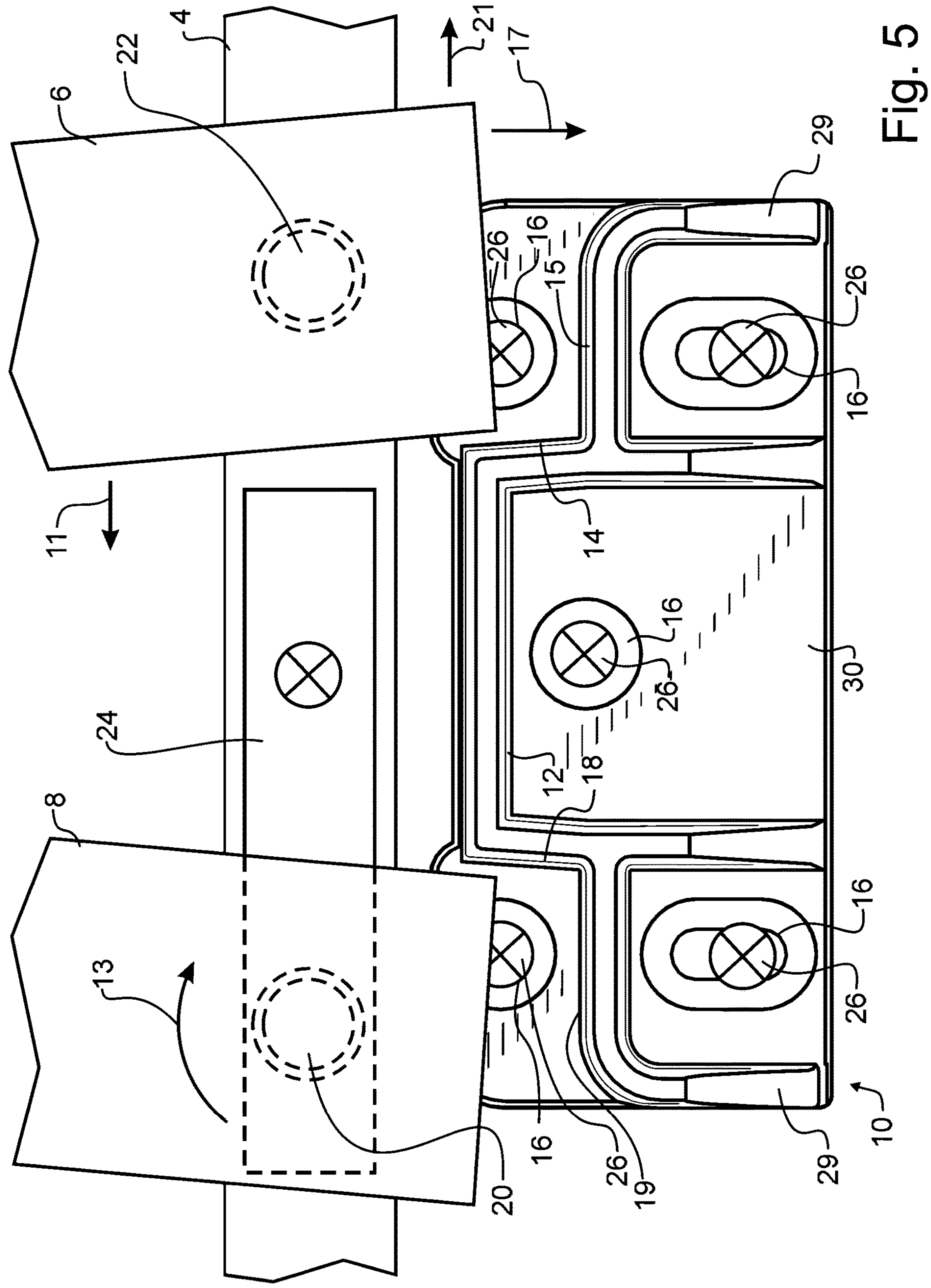
FIG. 5 illustrates the preferred embodiment bi-fold door stop of FIG. 1 in further combination with an open bi-fold door from a bottom plan view.
Figure 6:
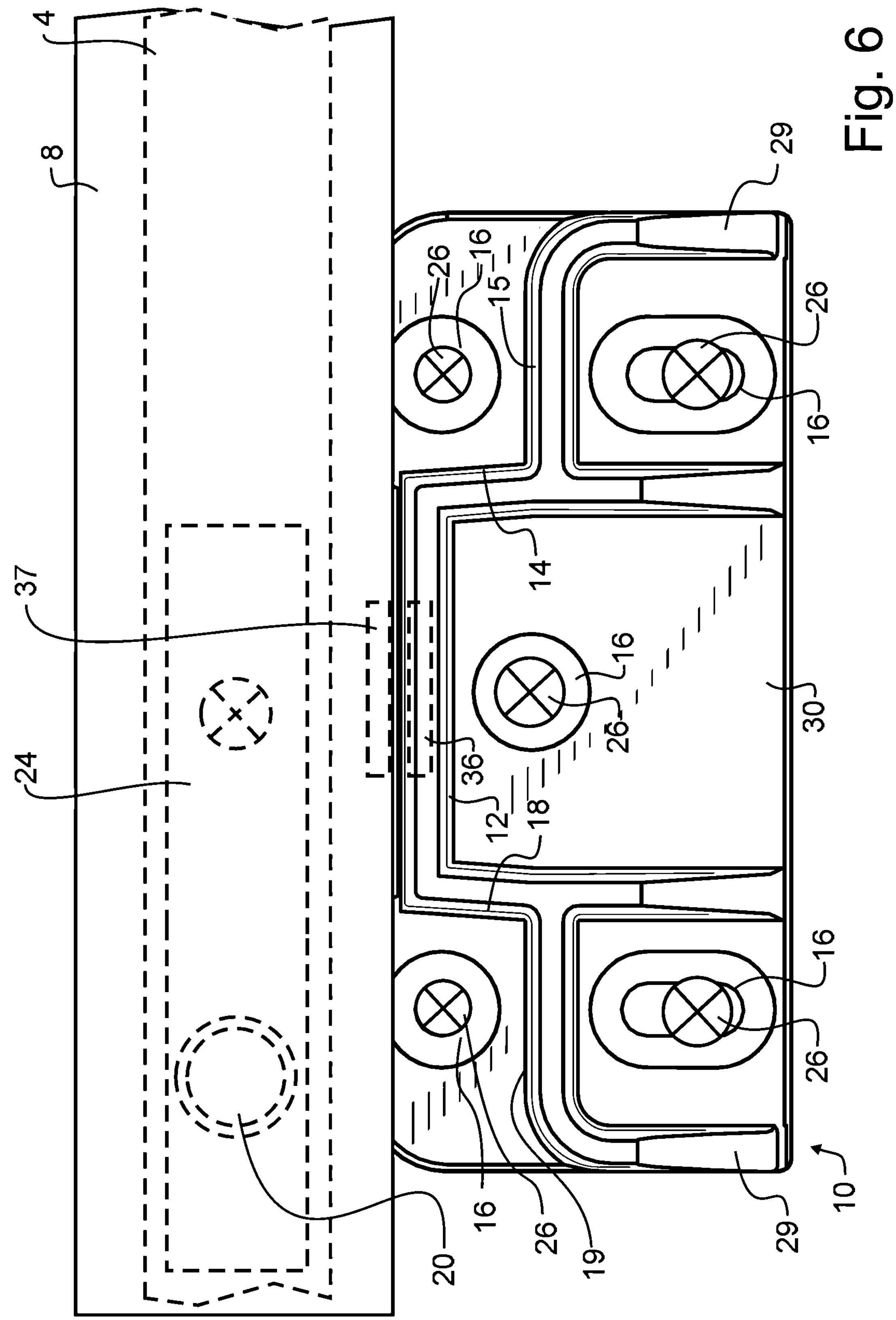
FIG. 6 illustrates the preferred embodiment bi-fold door stop of FIG. 1 in further combination with a closed bi-fold door from a bottom plan view.
Figure 7:
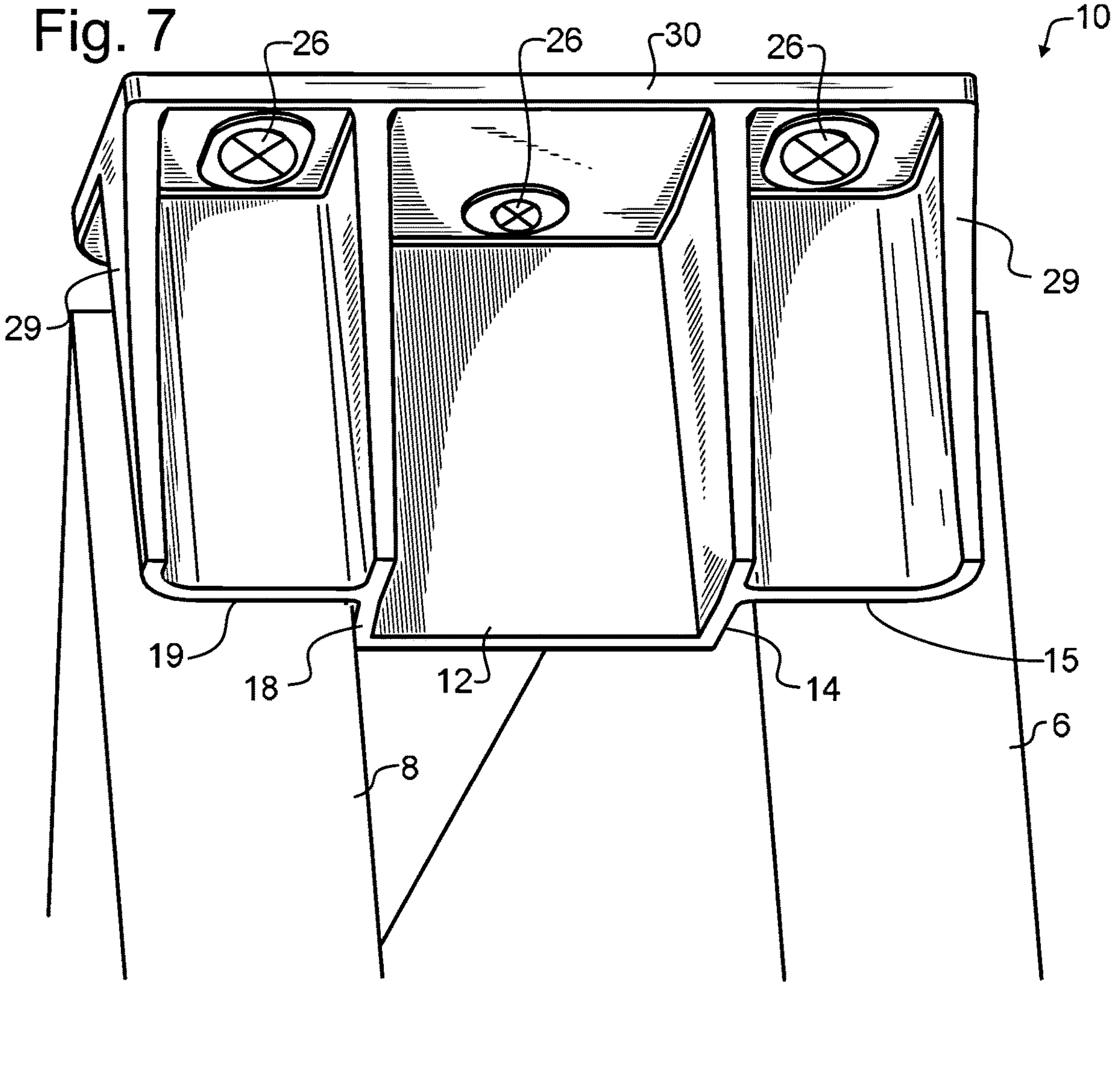
FIG. 7 illustrates the preferred embodiment bi-fold door stop of FIG. 1 in further combination with an open bi-fold door from a bottom, primarily rear projected view.

FIGS. 5-7 illustrate preferred embodiment bi-fold door stop 10 in combination with an exemplary prior art bi-fold door track 4, lead door 6, and pivot door 8.

Visible in FIG. 5, arrow 11 illustrates the travel direction of guide pin 22 as the bi-fold door is opened. As may be apparent, guide pin 22 will impact top pivot bracket 24 absent interaction with the present invention. However, with preferred embodiment bi-fold door stop 10 anchored to the ceiling or other structural support adjacent to door track 4, the stile of lead door 6 will come into contact with planar surface 14*a* of lead door opening stopper plate 14 and the stile of pivot door 8 will come into contact with planar surface 18*a* of pivot door opening stopper plate 18, each prior to guide pin 22 impacting top pivot bracket 24. Since contact with either of the opening stopper plates 14, 18 will be effective at preventing guide pin 22 impacting pivot bracket 24, even if there is a slight amount of torque in the bi-fold door, preferred embodiment bi-fold door stop 10 will still prevent unwanted damage. Furthermore, in the case of an extreme overload, between-doors spacer 12 will simply be put in compression, and, with appropriate and reasonable selection of materials, can withstand very substantial forces.

FIG. 5 also illustrates the rotation 13 of lead door 6 and pivot door 8 around an axis defined by the pivotal axis of pivot pin 20, and the direction 17 that guide pin 22 moves under this condition. As may be apparent, this is perpendicular to the proper direction 21 that lead door moves during closing. Preferred embodiment bi-fold door stop 10 prevents or at least limits this movement to an acceptable amount. At the time of installation of preferred embodiment bi-fold door stop 10, it will be important to limit the gap between the stile of lead door 6 and planar surface 15*a* of lead door rotation stopper plate 15, and also to limit the gap between the stile of pivot door 8 and planar surface 19*a* of pivot door rotation stopper plate 19 to a distance that can safely be accommodated by the play in pivot pin 20 and guide pin 22 and by door track 4. This will, of course, vary somewhat depending upon the particular pin and track constructions, but will be easily accommodated by aligning components as illustrated in FIG. 6.

FIG. 6 illustrates pivot door 8 in the closed position, where it will then be aligned in a parallel plane with between-doors spacer 12. As a result, if pivot door 8 or lead door 6 is accidentally pushed when the bi-fold door is closed, planar surface 12*a* of between-doors spacer 12 will prevent bi-fold track 4 from being inadvertently damaged. In other words, between-doors spacer 12 serves a several important functions. An optional magnet 36 is illustrated as embedded in between-doors spacer 12, to act on an optional ferrous or equivalent plate 37 attached to pivot door 8, and hole the door in a closed position. FIG. 7 illustrates preferred embodiment bi-fold door stop 10 in location with the bi-fold door in an open position similar to FIG. 5, but from a projected view rather than bottom plan view. Again from these Figures it is apparent that guide pin 22 is prevented from impacting pivot bracket 24, and movement of lead door 6 in a direction approximately perpendicular to bi-fold door track 4 is prevented.

Figure 8:
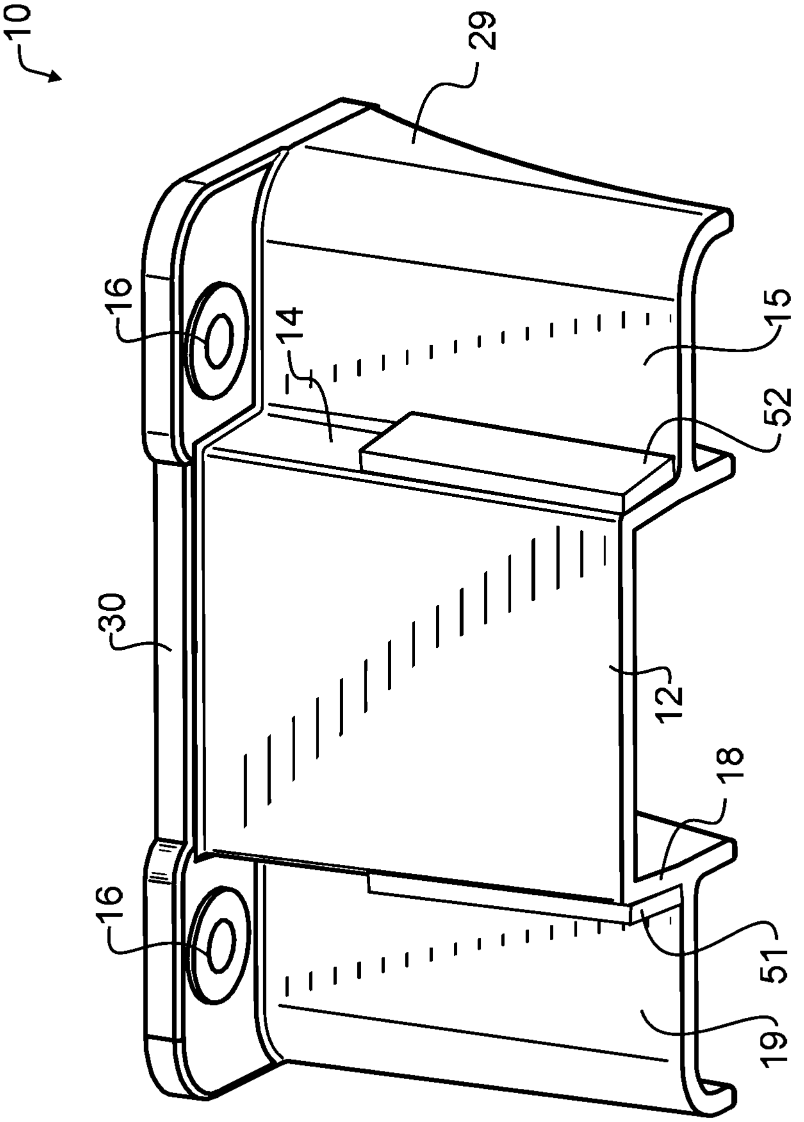
FIG. 8 illustrates the preferred embodiment bi-fold door stop of FIG. 1 in further combination with a pair of impact absorption pads from a bottom, primarily front projected view.
Figure 10:
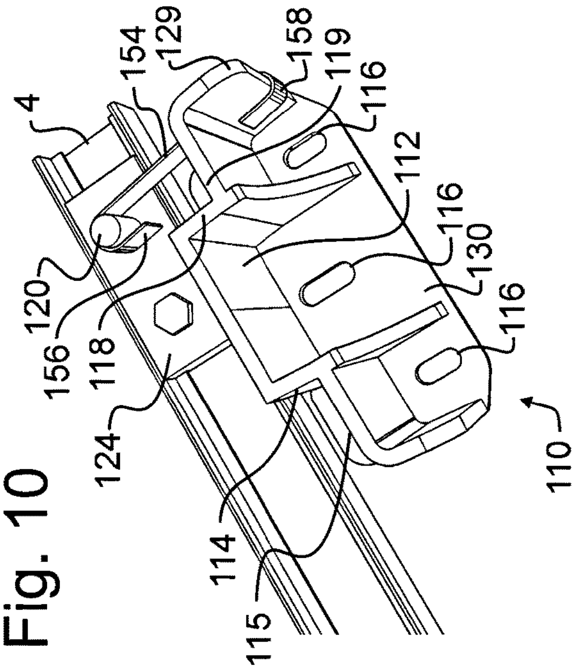
FIGS. 9-12 illustrate a first alternative embodiment bi-fold door stop designed in accord with the teachings of the present invention and in further combination with a pivot pin brace from bottom isometric, bottom and back projected, side elevational, and bottom plan views, respectively.
Figure 12:
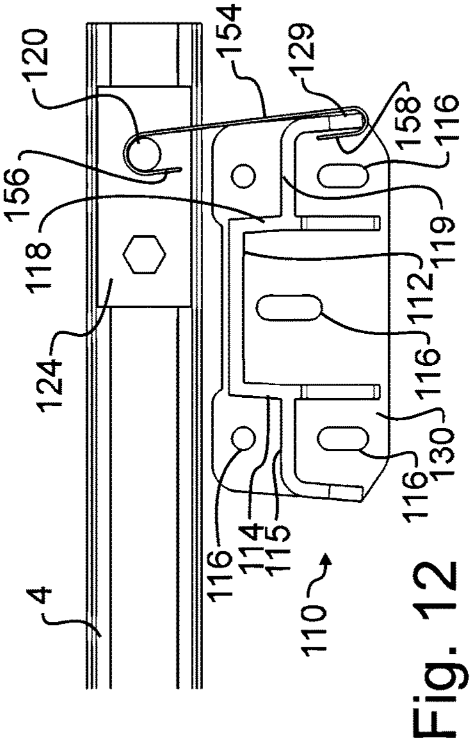
Figure 9:
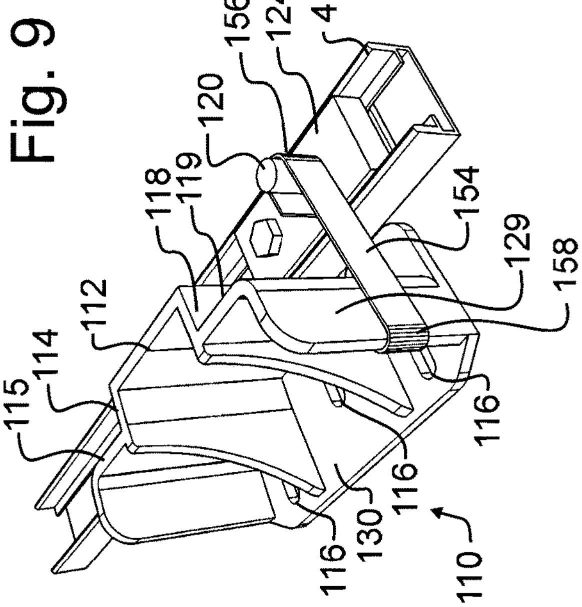
Figure 11:
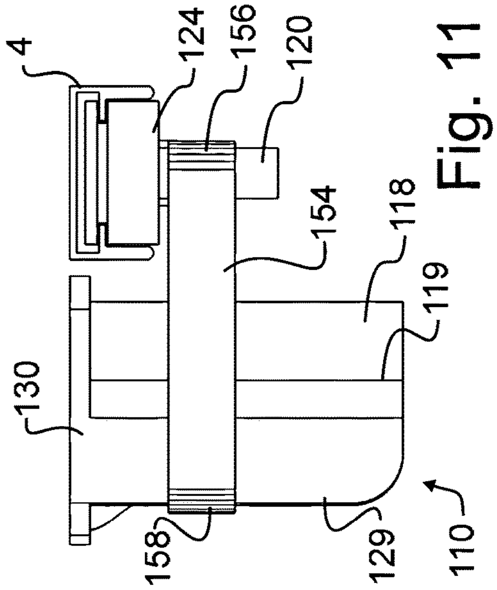

FIG. 8 illustrates preferred embodiment bi-fold door stop 10 in further combination with impact absorption pads 51, 52 that may, for exemplary purposes only and not solely limiting the present invention thereto, comprise elastomeric material such as a natural or synthetic foam rubber. As already noted herein above, the stile of lead door 6 will come into contact with lead door opening stopper plate 14 and the stile of pivot door 8 will come into contact with pivot door opening stopper plate 18, each prior to guide pin 22 impacting top pivot bracket 24. While these will be effective at preventing guide pin 22 impacting pivot bracket 24, the incorporation of impact absorption pads 51, 52 will soften that impact even further, not only reducing the likelihood of damage, but also rendering the hardware more silent in operation.

Noteworthy here is the slight curvature 25 of the interface between lead door rotation stopper plate 15 and generally vertical outside wall 29, and the similar curvature 27 of the interface between pivot door rotation stopper plate 19 and generally vertical outside wall 29. This curvature 25, 27 is not only aesthetic, but also helps to ensure that, even in the event of a sloppy set of pivot and guide pins 20, 22 and loose track 4, there will be no unwanted interference and instead the stiles of lead door 6 and pivot door 8 will be gracefully guided into proper contact with lead door rotation stopper plate 15 and pivot door rotation stopper plate 19.

Various embodiments of apparatus designed in accord with the present invention have been illustrated in FIGS. 1-8 and in FIGS. 9-12. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Alternative embodiment bi-fold door stop 110 particularly differs from preferred embodiment bi-fold door stop 10 in the geometry of vertical outside wall 129 of pivot door rotation stopper plate 119, which is far more vertical than the counterpart generally vertical outside wall 29. This allows a pivot pin brace 154 having clip hooks 156, 158 to be coupled between vertical outside wall 129 and pivot pin 120, providing a substantial improvement in strength and durability.

Other embodiments of a bi-fold door stop may use mechanisms to hold the door in the closed position which may include magnets, clasp or other means similar to or alternatively to those illustrated herein in FIG. 6. The mechanisms, or devices comprising the bi-fold door stop, or combination thereof may be located and installed on the doorway head jamb adjacent to the track, on the pivot jamb wall, or on the floor, or doorway threshold. The mechanism or device may be mounted on the track independently of the standard bi-fold track hardware, or might be incorporated into the standard bi-fold track hardware as a component part of the top pivot bracket or other hardware part. Other embodiments may use cushioning, pads, or springs to absorb the impact of the door panels on the bi-fold door stop. Surfaces of the bi-fold door stop may be smoothed or hardened to reduce wear and friction. Plates or other reinforcement may be affixed to the door panels to reduce wear from contact with the bi-fold door stop. The bi-fold door stop may be manufactured from a variety of materials, such as but not limited to plastic, metal, natural and synthetic rubbers, composites, and laminates. Other embodiments may use a variety of mounting and anchoring methods, including but not limited to mounting screws 26 as illustrated herein in FIGS. 5-7, or bolts, clamps, sub supporting plate, adhesive, epoxy, or other suitable fasteners. Other embodiments may include a mechanism to move lead door 6 from its fully open position to a slightly closed position where the hinges cannot be rotated ahead of guide pin 22.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A bi-fold door stop, comprising:

a supporting plate defining a first generally planar surface and configured to be fastened to a static structure;

a between-doors spacer defining a second generally planar surface extending from said supporting plate in a plane generally perpendicular to said first generally planar surface, said between-doors spacer configured to extend parallel to a longitudinal axis of a bi-fold door track and adjacent to said bi-fold door track and to separate a guide pin edge of a lead door from a pivot pin edge of a pivot door when said lead door and said pivot door are open;

a lead door opening stopper plate defining a third generally planar surface extending from said supporting plate in a plane generally perpendicular to said first generally planar surface and also generally perpendicular to said second generally planar surface, said lead door opening stopper plate configured to engage with said lead door guide pin edge when said lead door and pivot door are open;

a pivot door opening stopper plate defining a fourth generally planar surface extending in a plane generally parallel to and offset from said lead door opening stopper plate third generally planar surface;

a lead door rotation stopper plate defining a fifth generally planar surface extending in a plane generally parallel to and offset from said between-doors spacer second generally planar surface and offset therefrom by said lead door opening stopper plate third generally planar surface;

a pivot door rotation stopper plate defining a sixth generally planar surface extending coplanar with said lead door rotation stopper plate fifth generally planar surface and separated therefrom by said between-doors spacer second generally planar surface; and a curved interface coupled with an edge of said sixth generally planar surface distal to said between-doors spacer second generally planar surface and extending therefrom more distally from said between-doors spacer second generally planar surface and more distally from a plane defined by said between-doors spacer second generally planar surface.

2. The bi-fold door stop of claim 1, wherein said lead door rotation stopper plate fifth planar surface and said lead door opening stopper plate third generally planar surface intersect along mutual edges to define a corner therebetween and are affixed together at said intersection.

3. The bi-fold door stop of claim 1, wherein:

said lead door rotation stopper plate fifth planar surface and said lead door opening stopper plate third generally planar surface intersect to define a first corner therebetween and are affixed together at said lead door rotation stopper plate fifth planar surface and said lead door opening stopper plate third generally planar surface intersection;

said lead door opening stopper plate third planar surface and said between-doors spacer second generally planar surface intersect to define a second corner therebetween and are affixed together at said lead door rotation stopper plate third planar surface and said between-doors spacer second generally planar surface intersection;

said between-doors spacer second generally planar surface and said pivot door opening stopper plate fourth generally planar surface intersect to define a third corner therebetween and are affixed together at said between-doors spacer second generally planar surface and said pivot door opening stopper plate fourth generally planar surface intersection; and said pivot door opening stopper plate fourth planar surface and said pivot door rotation stopper plate sixth generally planar surface intersect to define a fourth corner therebetween and are affixed together at said pivot door opening stopper plate fourth planar surface and said pivot door rotation stopper plate sixth generally planar surface intersection.

4. The bi-fold door stop of claim 3, wherein said between-doors spacer second generally planar surface, said pivot door opening stopper plate fourth generally planar surface, and said pivot door rotation stopper plate sixth generally planar surface each extend from and are rigidly affixed to said supporting plate.

5. The bi-fold door stop of claim 1, further comprising a means for affixing said supporting plate to said static structure.

6. The bi-fold door stop of claim 1, wherein said static structure further comprises a head jamb and said affixing means further comprises at least one hole passing entirely through said supporting plate.

7. The bi-fold door stop of claim 1, wherein said between-doors spacer is configured to engage with and thereby limit travel of said pivot door in a direction perpendicular to said bi-fold door track longitudinal axis when said lead door and pivot door are in a closed position.

8. A bi-fold door stop, comprising:

a supporting plate defining a first generally planar surface and configured to be fastened to a static structure;

a between-doors spacer defining a second generally planar surface extending from said supporting plate in a plane generally perpendicular to said first generally planar surface, said between-doors spacer configured to extend parallel to a longitudinal axis of a bi-fold door track and adjacent to said bi-fold door track and to separate a guide pin edge of a lead door from a pivot pin edge of a pivot door when said lead door and said pivot door are open;

a lead door opening stopper plate defining a third generally planar surface extending from said supporting plate in a plane generally perpendicular to said first generally planar surface and also generally perpendicular to said second generally planar surface, said lead door opening stopper plate configured to engage with said lead door guide pin edge when said lead door and said pivot door are open;

a lead door rotation stopper plate defining a fifth generally planar surface extending in a plane generally parallel to and offset from said between-doors spacer second generally planar surface and offset therefrom by said lead door opening stopper plate third generally planar surface, said lead door rotation stopper plate configured when said lead door and said pivot door are open to limit a maximum amount of rotation of said lead door around a pivotal axis of a pivot pin of said pivot door;

a pivot door opening stopper plate defining a fourth generally planar surface extending in a plane generally parallel to and offset from said lead door opening stopper plate third generally planar surface;

a pivot door rotation stopper plate defining a sixth generally planar surface extending coplanar with said lead door rotation stopper plate fifth generally planar surface and separated therefrom by said between-doors spacer second generally planar surface, said pivot door rotation stopper plate configured when said lead door and said pivot door are open to limit a maximum amount of travel of said pivot door transverse to a longitudinal axis of said bi-fold door track; and a curved interface coupled with an edge of said sixth generally planar surface distal to said between-doors spacer second generally planar surface and extending therefrom more distally from said between-doors spacer second generally planar surface and more distally from a plane defined by said between-doors spacer second generally planar surface.

9. The bi-fold door stop of claim 8, wherein said lead door rotation stopper plate fifth planar surface and said lead door opening stopper plate third generally planar surface intersect along mutual edges to define a corner therebetween and are affixed together at said intersection.

10. The bi-fold door stop of claim 8, wherein:

said lead door rotation stopper plate fifth planar surface and said lead door opening stopper plate third generally planar surface intersect to define a first corner therebetween and are affixed together at said lead door rotation stopper plate fifth planar surface and said lead door opening stopper plate third generally planar surface intersection;

said lead door opening stopper plate third planar surface and said between-doors spacer second generally planar surface intersect to define a second corner therebetween and are affixed together at said lead door rotation stopper plate third planar surface and said between-doors spacer second generally planar surface intersection;

said between-doors spacer second generally planar surface and said pivot door opening stopper plate fourth generally planar surface intersect to define a third corner therebetween and are affixed together at said between-doors spacer second generally plane surface and said pivot door opening stopper plate fourth generally planar surface intersection; and said pivot door opening stopper plate fourth planar surface and said pivot door rotation stopper plate sixth generally planar surface intersect to define a fourth corner therebetween and are affixed together at said pivot door opening stopper plate fourth planar surface and said pivot door rotation stopper plate sixth generally planar surface intersection.

11. The bi-fold door stop of claim 10, wherein said between-doors spacer second generally planar surface, said pivot door opening stopper plate fourth generally planar surface, and said pivot door rotation stopper plate sixth generally planar surface each extend from and are rigidly affixed to said supporting plate.

12. The bi-fold door stop of claim 8, further comprising a means for affixing said supporting plate to said static structure.

13. The bi-fold door stop of claim 8, wherein said static structure further comprises a head jamb and said affixing means further comprises at least one hole passing entirely through said supporting plate.

14. The bi-fold door stop of claim 8, wherein said between-doors spacer is configured to engage with and thereby limit travel of said pivot door in a direction perpendicular to said bi-fold door track longitudinal axis when said lead door and pivot door are in a closed position.

15. A bi-fold door stop, comprising:

a supporting plate defining a first generally planar surface and configured to be fastened to a static structure;

a between-doors spacer defining a second generally planar surface extending from said supporting plate in a plane generally perpendicular to said first generally planar surface, said between-doors spacer configured to extend parallel to a longitudinal axis of a bi-fold door track and adjacent to said bi-fold door track and to separate a guide pin edge of a lead door from a pivot pin edge of a pivot door when said lead door and said pivot door are open;

a lead door opening stopper plate defining a third generally planar surface extending from said supporting plate in a plane generally perpendicular to said first generally planar surface and also generally perpendicular to said second generally planar surface, said lead door opening stopper plate configured to engage with said lead door guide pin edge when said lead door and said pivot door are open; and a lead door rotation stopper plate defining a fifth generally planar surface extending in a plane generally parallel to and offset from said between-doors spacer second generally planar surface and offset therefrom by said lead door opening stopper plate third generally planar surface, said lead door rotation stopper plate configured when said lead door and said pivot door are open to limit a maximum amount of rotation of said lead door around a pivotal axis of a pivot pin of said pivot door, wherein said lead door opening stopper plate third generally planar surface and a major surface of said lead door are generally parallel to each other when said lead door and said pivot door are open.

16. A bi-fold door stop, comprising:

a supporting plate defining a first generally planar surface and configured to be fastened to a static structure;

a between-doors spacer defining a second generally planar surface extending from said supporting plate in a plane generally perpendicular to said first generally planar surface, said between-doors spacer configured to extend parallel to a longitudinal axis of a bi-fold door track and adjacent to said bi-fold door track and to separate a guide pin edge of a lead door from a pivot pin edge of a pivot door when said lead door and said pivot door are open;

a lead door opening stopper plate defining a third generally planar surface extending from said supporting plate in a plane generally perpendicular to said first generally planar surface and also generally perpendicular to said second generally planar surface, said lead door opening stopper plate configured to engage with said lead door guide pin edge when said lead door and said pivot door are open;

a lead door rotation stopper plate defining a fifth generally planar surface extending in a plane generally parallel to and offset from said between-doors spacer second generally planar surface and offset therefrom by said lead door opening stopper plate third generally planar surface, said lead door rotation stopper plate configured when said lead door and said pivot door are open to limit a maximum amount of rotation of said lead door around a pivotal axis of a pivot pin of said pivot door; and a pivot door rotation stopper plate defining a sixth generally planar surface extending coplanar with said lead door rotation stopper plate fifth generally planar surface and separated therefrom by said between-doors spacer second generally planar surface, said pivot door rotation stopper plate configured when said lead door and said pivot door are open to limit a maximum amount of travel of said pivot door transverse to a longitudinal axis of said bi-fold door track;

wherein said pivot door opening stopper plate sixth generally planar surface and a major surface of said pivot door are generally parallel to each other when said lead door and said pivot door are open.

* * * * *